United States Patent [19]

Davis et al.

[11] Patent Number: 5,803,213

[45] Date of Patent: Sep. 8, 1998

[54] HEAVY LOAD VIBRATION ISOLATION APPARATUS

[75] Inventors: Toren S. Davis, Peoria; David A. Osterberg, Glendale, both of Ariz.

[73] Assignee: Honeywell Inc., Minneapolis, Minn.

[21] Appl. No.: 792,745

[22] Filed: Feb. 3, 1997

[51] Int. Cl.$^6$ .................................. F16F 7/10; F16F 9/00
[52] U.S. Cl. ..................... 188/378; 188/298; 188/312; 188/317; 267/136; 267/186; 267/221; 267/122; 267/64.25
[58] Field of Search ..................... 267/195, 221, 267/186, 136, 196, 217, 224, 226, 122, 64.16, 34, 64.15, 64.25, 64.26, 64.13; 248/631, 562, 636, 638, 613, 550; 188/317, 378, 379, 380, 298, 312, 280, 322.13, 322.22, 322.15, 314, 318, 266.1

[56] References Cited

U.S. PATENT DOCUMENTS

| | | | |
|---|---|---|---|
| 3,186,702 | 6/1965 | Taylor | 267/1 |
| 3,204,945 | 9/1965 | Taylor | 267/64 |
| 3,256,005 | 6/1966 | Taylor | 267/64 |
| 3,303,856 | 2/1967 | Taylor | 138/31 |
| 3,592,422 | 7/1971 | Paine et al. | 248/613 |
| 3,933,344 | 1/1976 | Taylor | 267/64 A |
| 3,947,004 | 3/1976 | Taylor | 267/65 R |
| 3,980,358 | 9/1976 | Davis | 308/173 |
| 4,031,978 | 6/1977 | Taylor | 180/91 |
| 4,064,977 | 12/1977 | Taylor | 188/317 |
| 4,150,819 | 4/1979 | Taylor | 267/136 |
| 4,242,917 | 1/1981 | Bennett et al. | 74/5.5 |
| 4,254,988 | 3/1981 | Taylor et al. | 296/190 |
| 4,265,344 | 5/1981 | Taylor | 188/322 |
| 4,389,045 | 6/1983 | Taylor | 267/8 R |
| 4,532,856 | 8/1985 | Taylor | 92/168 |
| 4,535,876 | 8/1985 | Taylor | 188/311 |
| 4,548,041 | 10/1985 | Taylor | 60/632 |
| 4,558,767 | 12/1985 | Taylor | 188/282 |
| 4,564,048 | 1/1986 | Taylor | 138/31 |
| 4,582,303 | 4/1986 | Taylor | 267/64.13 |
| 4,585,099 | 4/1986 | Taylor | 188/322.19 |
| 4,591,030 | 5/1986 | Antkowiak | 188/268 |
| 4,591,033 | 5/1986 | Taylor | 188/317 |
| 4,611,794 | 9/1986 | Taylor | 267/64.13 |
| 4,628,579 | 12/1986 | Taylor | 29/422 |
| 4,630,805 | 12/1986 | Taylor | 267/64.13 |
| 4,638,895 | 1/1987 | Taylor et al. | 188/280 |
| 4,674,398 | 6/1987 | Taylor | 91/459 |
| 4,718,648 | 1/1988 | Taylor | 267/64.13 |

(List continued on next page.)

OTHER PUBLICATIONS

Document entitled "Adaptable Passive Viscous Damper (an Adaptable D–Strut™)" by Porter Davis and David Cunningham of Honeywell Inc., Satellite Systems Operation; Glendale, AZ 85308 and Andy Bicos and Mike Enright of McDonnell Douglas Aerospace; Huntington Beach, CA 92647; pp. 1–12.

Document entitled "Actuator With Built–in Viscous Damping for Isolation and Structural Control" by T. Tupper Hyde and Eric H. Anderson of Space Engineering Research Center; Department of Aeronautics and Astronautics; Massachusetts Institute of Technology, Cambridge, Mass. 02139.

Document entitled "An Advanced D–Strut™" by L. Porter Davis and Steven D. Ginter of Honeywell Inc. Satellite Systems Operation presented at the Damping 91 Conference, San Diego, California; pp. 1–17.

(List continued on next page.)

Primary Examiner—Douglas C. Butler
Attorney, Agent, or Firm—Charles J. Ungemach

[57] ABSTRACT

A damping mounting structure for use between two members for isolating motion changes which incorporates a plurality of dampers connected between the two members with spring members operating in parallel with the dampers to provide stiffness and where the springs are pneumatic to provide proper stiffness when the load is heavy without damage to the springs and/or to provide variable stiffness when desired.

14 Claims, 3 Drawing Sheets

U.S. PATENT DOCUMENTS

| | | | |
|---|---|---|---|
| 4,730,706 | 3/1988 | Taylor et al. | 188/297 |
| 4,738,339 | 4/1988 | Taylor | 188/322.19 |
| 4,749,071 | 6/1988 | Taylor | 188/322.19 |
| 4,760,996 | 8/1988 | Davis | 267/122 |
| 4,768,627 | 9/1988 | Taylor | 188/280 |
| 4,773,164 | 9/1988 | Taylor et al. | 33/520 |
| 4,793,451 | 12/1988 | Taylor | 188/316 |
| 4,796,873 | 1/1989 | Schubert | 248/550 |
| 4,815,574 | 3/1989 | Taylor et al. | 188/280 |
| 4,819,919 | 4/1989 | Taylor | 267/64.13 |
| 4,848,525 | 7/1989 | Jacot et al. | 188/378 |
| 4,867,043 | 9/1989 | Antkowiak | 92/165 R |
| 4,867,286 | 9/1989 | Taylor | 188/282 |
| 4,877,114 | 10/1989 | Taylor | 188/285 |
| 4,877,226 | 10/1989 | Taylor | 267/196 |
| 4,892,051 | 1/1990 | Taylor et al. | 114/1 |
| 5,121,128 | 6/1992 | Van Lidth de Jeude et al. | 343/741 |
| 5,133,435 | 7/1992 | Taylor | 188/381 |
| 5,199,690 | 4/1993 | Marshall | 267/136 |
| 5,219,051 | 6/1993 | Davis | 188/378 |
| 5,249,783 | 10/1993 | Davis | 267/217 |
| 5,265,552 | 11/1993 | Taylor | 114/219 |
| 5,305,981 | 4/1994 | Cunningham et al. | 248/550 |
| 5,318,156 | 6/1994 | Davis | 188/298 |
| 5,332,070 | 7/1994 | Davis et al. | 188/298 |
| 5,354,158 | 10/1994 | Sheldon et al. | 248/631 |
| 5,356,110 | 10/1994 | Eddy | 248/638 |
| 5,370,352 | 12/1994 | Platus | 248/638 |
| 5,538,373 | 7/1996 | Kirkham | 248/562 |

OTHER PUBLICATIONS

Document entitled "Design of a D–Strut™ and Its Application Results in the JPL, MIT, and LaRC Test Beds" by L. Porter Davis and Brian J. Workman of Honeywell Inc., Satellite Systems Operation; Glendale, AZ and Cheng–Chih Chu of Jet Propulsion Laboratory; Pasadena, California and Eric H. Anderson of Massachusetts Institute of Technology, Space Engineering Research Center; Cambridge, Massachusetts; Presented at the American Institute of Aeronautics and Astronautics Structural Dynamics Meeting; Dallas, Texas; Apr. 13, 1992; pp. 1–7.

Document entitled "Advanced 1.5 Hz Passive Viscous Isolation System" by Porter Davis, David Cunningham and John Harrell; presented at the 35th AIAA SDM Conference; Hilton Head, South Carolina; Apr. 1994, copyright 1994, Honeywell Inc. pp. 1–11.

Document entitled "Second Generation Hybrid D–Strut™" by Porter Davis and Delano Carter of Honeywell Inc., Satellite Systems Operation; Glendale, AZ 85308 and T. Tupper Hyde of Space Engineering Research Center; Massachusetts Institute of Technology, Cambridge, Massachusetts 02139; presented at the SPIE Smart Structures and Materials Conference; Feb. 1995; San Diego, California, pp. 1–15.

Document entitled "Satellite Isolation and Structural Control"; prepared by Porter Davis and Tim Hintz; Jan. 1995.

HEAVY LOAD VIBRATION ISOLATION APPARATUS

BACKGROUND OF INVENTION

1. Field of the Invention

The present invention relates to an improved apparatus operable to isolate a load from vibration of a base device to which it is attached and more particularly to provide a novel pneumatic spring arrangement for a system such as is described in a copending application of David A. Osterberg entitled Load Isolation Apparatus, filed Jan. 29, 1997 having U.S. Ser. No. 08/709,647 and copending application of Toren S. Davis et al filed Feb. 3, 1997 having U.S. Ser. No. 08/794,556 both of which are assigned to the assignee of the present invention. In the copending Osterberg application, a novel damping concept is described which provides a support for a load with lesser stiffness for relative motions in translational directions than it does for relative motion in rotational directions. The Davis et al invention provides an improvement in the stability of the Osterberg application and provides protection against damage. The present invention supplies a novel pneumatic spring arrangement for use in the Osterberg and Davis et al applications to reduce the weight and complexity of the system.

2. Description of the Prior Art

The above referred to copending applications have utility in various fields including automotive, test machinery and the like, but for convenience, the copending applications and the present application are described in the environment of a payload, such as a satellite, mounted on a base such as a launching vehicle. In the copending applications it is explained that in the prior art isolation is achieved by placing elastic members between the launch vehicle and the payload and then placing damping members across the elastic members to provide damping. In such applications, it is difficult to support the payload at the center-of-gravity allowing translational motion to be cross coupled into rotational motion causing the payload to sway. This rotation is undesired since, for payloads such as inertial measurement units (IMU's) their alignment must be maintained with respect to the vehicle, and, for satellites, the sway uses up the available "rattle space" between the satellite and the inside of the aerodynamic faring. Accordingly, it is advantageous to stiffen the rotational degrees-of-freedom while softening the translational degrees of freedom.

In the prior art, the payload has been supported by independent spring/damper units, typically mounted at various angles to provide the proper stiffness in each degree-of-freedom. In such a configuration, each spring/damper unit operates independent of the others. Other approaches have been to distribute the stiffness and damping around the base of the payload. The rotational stiffness of these isolation systems are limited by the center-of-gravity offset of the payload and the diameter across the base (mounting circle) and, while changing the angles of the spring/damper units allows some freedom in selecting the proper stiffness, the results are limited.

The invention of the copending Osterberg application overcomes the problems of the prior art by cross coupling opposite damping elements, rather than having them operate independently, to provide a predetermined stiffness to motions in the three translational directions and a considerably greater stiffness to rotational motions. The invention also describes an accumulator connected to the cross coupling conduits to provide pressurization for the fluid in the conduits and to receive fluid excess due to thermal expansion. In order to prevent a softening of the rotational damping due to the flow of fluid into the accumulator when the pressure of the fluid increases due to rotational forces, the conduits to the accumulator were made much more restrictive than the conduits in cross coupling. Normally this has the desired effect since pressure changes due to most rotational forces are much more rapid than pressure changes due to temperature changes, and no significant amount of fluid would flow to the accumulator during the rapid pressure changes produced by normal rotational forces but fluid would still flow to the accumulator during the much slower temperature changes. However, it is desirable that the system provide a desired amount of stiffness even when very slow rotational forces are encountered at near static conditions and under these circumstances, the restrictions in the lines to the accumulator were found to not prevent fluid flowing out of the cross connections to the accumulator which reduced the stiffness. While the accumulator could be removed entirely, (and in some cases an accumulator may not be necessary), for most applications, pressures due to extreme temperature changes or very large rotational forces or pressures due to temperature changes added to the pressure due to rotational forces could become high enough to cause structural damage to the system. The copending Davis et al application solves this problem by providing one-way valves that prevent flow of pressurized fluid from the system to the accumulator while allowing the accumulator to continue to pressurize the system with fluid flow in the opposite direction. To prevent too much pressure build up due to temperature and/or rotation, relief or "burp" valves are used to allow a little pressure to bleed off during these conditions but not enough to effect the pressurization of the system to the desired level.

While the above described systems operate satisfactorily, the mechanical springs used in parallel with the dampers were found to be less than desirable for very heavy loads since it is desired that the natural frequency of the spring used with the dampers combined with the mass of the load to be isolated be kept as low as possible. The natural frequency is given by the equation $Fn=\frac{1}{2}\pi (K/M)^{1/2}$ where K is the stiffness of the isolator mount and M is the mass of the load to be isolated. It is seen that as M increases the frequency decreases, as desired, but with the lesser stiffness comes a larger amount of deflection and at very heavy loading conditions, such as during launch where inertia forces combine with gravitational forces, the spring can deflect too much and even break. Designing mechanical springs to handle such heavy loads and still allow desired stiffness becomes a very difficult problem. Furthermore, during and after launch, it is desirable to change the stiffness of the springs for the new conditions and, of course, this cannot be readily done with mechanical springs.

BRIEF DESCRIPTION OF THE INVENTION

The present invention overcomes these problems with a pneumatic spring comprising a piston in a housing connected between the load and the vehicle. The piston divides the housing into two chambers each of which is pressurized. By adjusting the pressures in the two chambers correctly, the stiffness of the spring can be set as desired to handle very heavy loads. Furthermore, the stiffness can be changed during and after launch by changing the pressures in the two chambers.

DETAILED DESCRIPTION OF THE PREFERRED EMBODIMENTS

Figure 1:
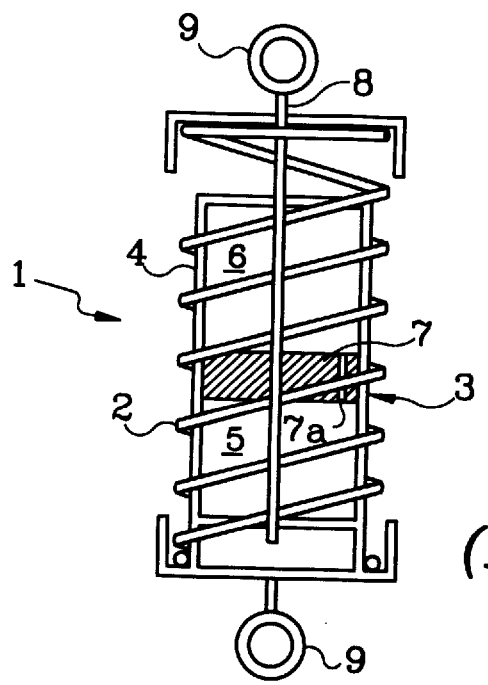
FIG. 1 shows a spring/damper device known in the prior art.

FIG. 1 shows a spring/damper device 1 presently available in the prior art. Spring damper 1 has a spring 2 wound around a viscous damper 3 having a housing 4. Spring 2 provides static stiffness and damper 3 provides a damping force which is generated by a fluid in chambers 5 and 6 in housing 4 flowing either around a piston 7 separating chambers 5 and 6 or through a restrictive passage 7a in piston 7. Piston 7 has a piston rod 8 extending upwardly through a seal in the top of chamber 6 and downwardly through a seal in the bottom of chamber 5. Rotational pivots 9 are connected to the piston rod 8 and to the lower part of housing 4 to allow small rotations when spring/damper 1 is connected between a payload and a launch vehicle as will be better seen in connection with FIGS. 2a and 2b.

Figure 2A:
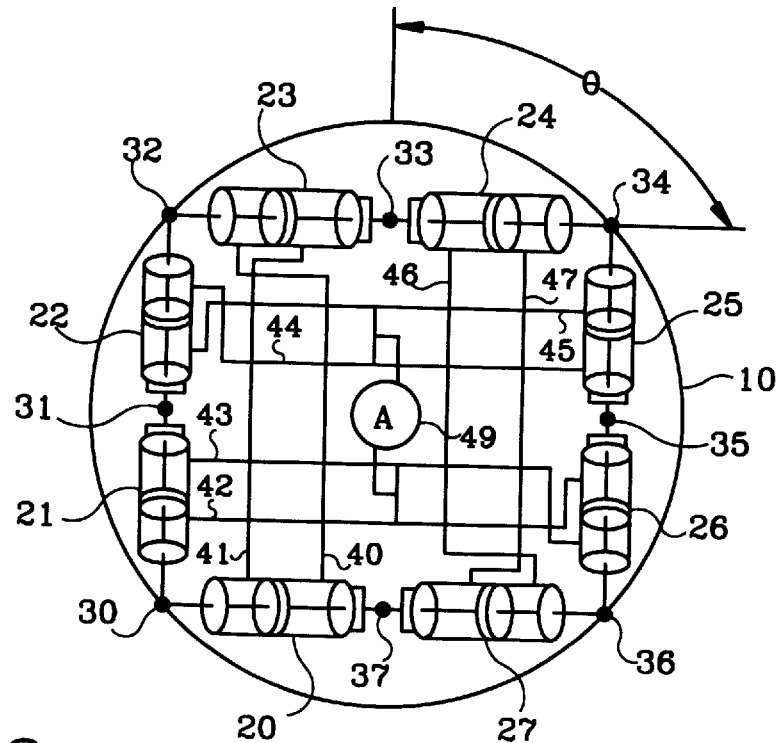
FIGS. 2a and 2b show a top view and side view of an isolation section between a vehicle and a paylaod of the present invention.
Figure 2B:
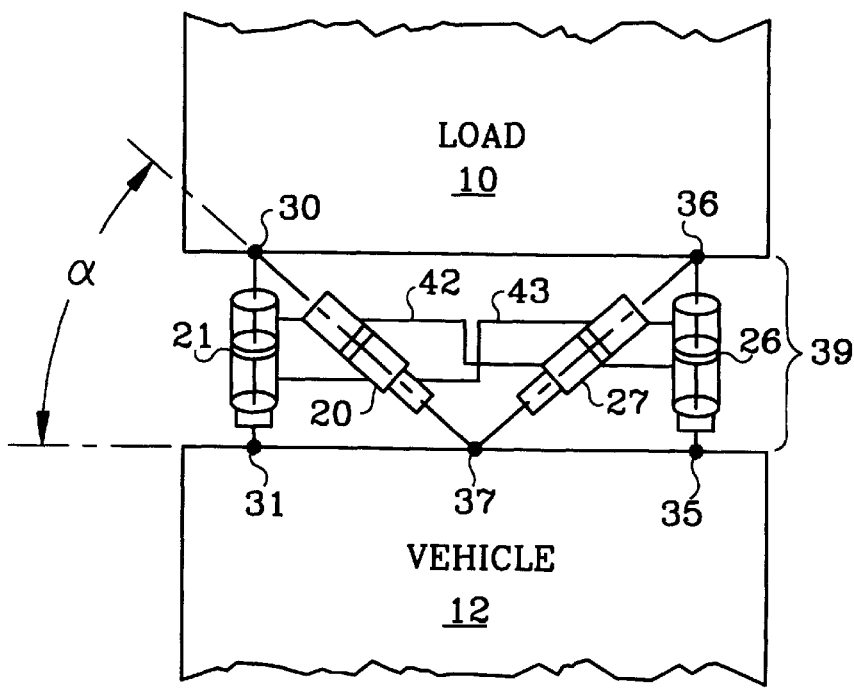

FIGS. 2a and 2b show how an arrangement of spring/dampers can be configured to support and isolate a load 10 from a launch vehicle 12. It is seen that eight spring/dampers shown by reference numerals 20–27 are configured in a rectangular arrangement in a vibration isolation section 29 between the load 10 and the vehicle 12. Each damper is divided into first and second chambers by a piston as was the case in FIG. 1. The springs, such as spring 2 in FIG. 1, have not been shown in FIGS. 2a and 2b to avoid unnecessary complexity. It takes a minimum of six spring/dampers to fully constrain the system in all degrees of freedom but eight spring dampers have been shown in FIGS. 2a and 2b as a convenient number for the preferred embodiment. It will be understood that a number of spring/dampers larger than six or eight may be used and configurations other than rectangular may be employed.

It is seen in FIGS. 2a and 2b that dampers 20 and 21 are connected together at a common point 30 to the load 10, dampers 21 and 22 are connected at a common point 31 to the vehicle 12, dampers 22 and 23 are connected at a common point 32 to the load 10, dampers 23 and 24 are connected at a common point 33 to the vehicle 12, dampers 24 and 25 are connected at a common point 34 to the load 10, dampers 25 and 26 are connected at a common point 35 to the vehicle 12, dampers 26 and 27 are connected at a common point 36 to the load 10 and dampers 27 and 20 are connected at a common point 37 to the vehicle 12. While I have shown the piston of each damper connected to the piston of the adjacent dampers, these connections can be independent and connected to the load 10 and the vehicle 12 at individual points. Each spring/damper is at an angle α between the vehicle 12 and the load 10 as seen from the side in FIG. 2b and at an angle θ between the vehicle 12 and the load 10 as seen from the top in FIG. 2a. The angles α and θ do not necessarily have to be the same for all of the spring/dampers. By adjusting angles α and θ, the ratio of the various stiffnesses and damping in the rotational and translational axes may be adjusted. Unfortunately, the stiffness and damping about the rotational axes can only be controlled very slightly by changing the damper angles and while the rotational stiffness and damping can be better adjusted by spacing the dampers apart in larger and smaller mounting circles, this changes the space requirements of the system.

Figure 3:
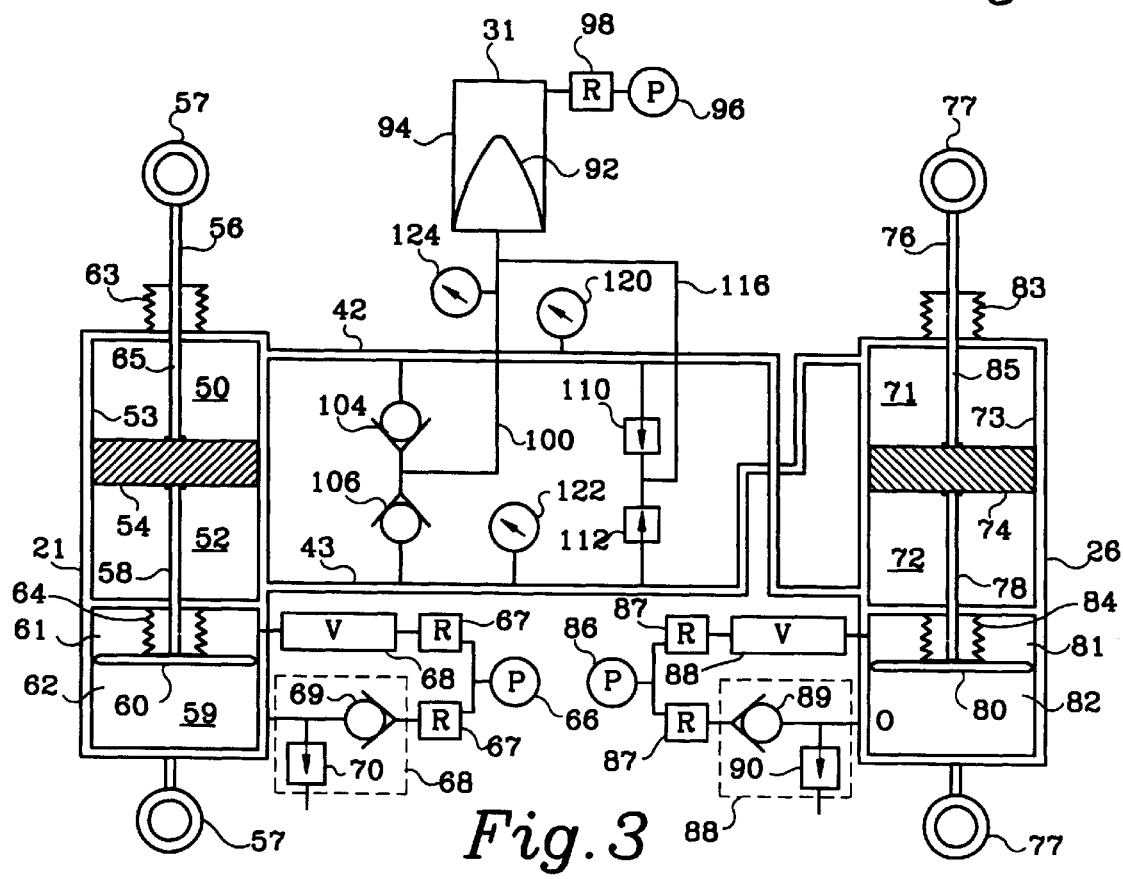
FIG. 3 shows the cross coupling arrangement of the present invention.

In the invention of the above mentioned Osterberg application, cross coupling conduits 40–47 are supplied to allow fluid flow between oppositely placed damper chambers and an accumulator 49 is connected to each cross coupled conduit by connections which may be better seen in FIG. 3.

In FIG. 3, two of the oppositely located spring/dampers 21 and 26 are shown as an example, it being understood that each of the spring/dampers and its oppositely placed counterpart in FIGS. 2a and 2b are similarly interconnected. In FIG. 3, damper 21 is shown having a first or upper chamber 50 and a second or lower chamber 52 within a housing 53, filled with an incompressible fluid and separated by a piston 54. No restricted passage through or around piston 54 is needed since fluid flow between chambers 50 and 52 is provided by cross conduits 42 and 43, as will be explained. A first piston rod 56 extends upwardly from piston 54 to the exterior of damper 21 where it will be connected to load 10 at point 30 (not shown in FIG. 3) by a pivot 57 similar to the pivot 9 of FIG. 1. A second piston rod 58 extends downwardly from piston 54 to the exterior of chamber 52 into a lower chamber 59 where it is connected to a piston 60 which divides chamber 59 into an upper chamber 61 and a lower chamber 62 to provide spring force for the system as will be explained. It will be noted that piston rod 58 provides an area on the lower surface of piston 54 which has the same area exposed to the fluid in the first and second chambers 50 and 52. This allows piston 54 to displace equal volumes (although of opposite signs) of the incompressible fluid in both chambers 50 and 52 when piston rod 56 is moved in or out of damper 21.

The lower part of housing 53 is shown connected to another pivot 57 similar to pivot 9 of FIG. 1 for connection to vehicle 12 at point 31 (not shown in FIG. 3).

Hermetic seals are shown using an upper or first bellows 63 and a lower or second bellows 64 on the ends of chambers 50 and 52 to provide a motion transmitting fluid seals for chambers therefore. A conduit 65 joins the interiors of bellows 60 and 62 respectively through the interior of pistons rods 56 and 58 and is selected to be relatively non-restrictive to fluid flow. It is understood that various other sealing techniques can be used including sliding non-hermetic seals without effecting the operation of the present invention.

Figure 4:
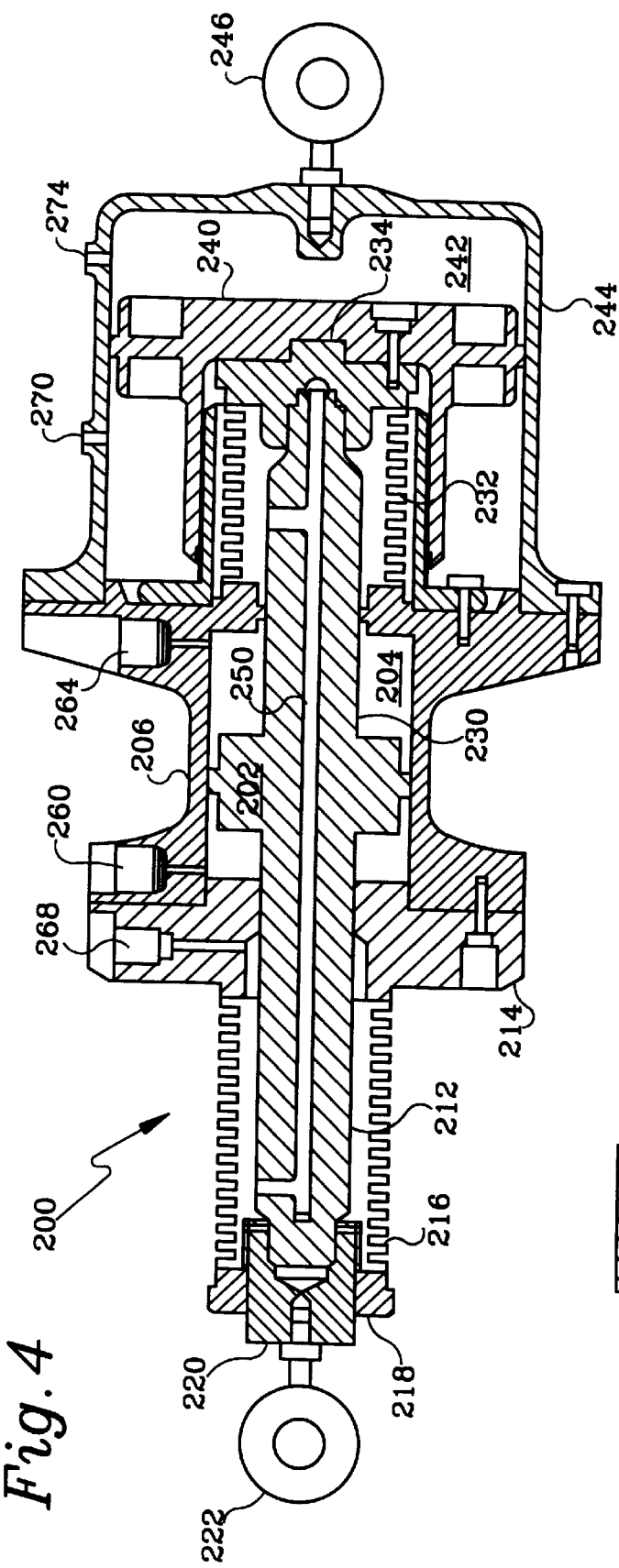
FIG. 4 shows a crossectional view of a spring/damper of the present invention; and, FIG. 5 shows a crossectional view of an alternate accumulator for use in the present invention.

A source of compressible fluid 66 is shown supplying pressure to the upper and lower chambers 61 and 62 through a pair of pressure regulators 67 and a valve device 68 so that when the system is experiencing dynamic loads, as for example during launch when the pressures from the load change with various conditions, the pressures in chambers 61 and 62 can be independently controlled by the pressure regulators 67 to provide the proper stiffness for the changing conditions as will be explained in connection with FIG. 4. As will also be explained, under static conditions when the load is still as on the launch pad, the pressure regulators do not need to independently vary the pressures in chambers 61 and 62 and would only be used, if needed at all, to compensate for leakage. Accordingly, after the pressures in chambers 61 and 62 have been equalized, the pressure regulators 67 may be shut off by a manual or electric valve, not shown. Relief valve 70 is shown connected to the line from chamber 62 to the ball valve 69 so as to protect the system from over pressurization by releasing pressure when it exceeds a predetermined value.

Damper 26 is arranged the same as damper 21 having a first or upper chamber 70 and a second or lower chamber 72 within a housing 73 separated by a piston 74. Again, no restricted passage through or around piston 74 is needed since fluid flow between chambers 70 and 72 is provided by cross conduits 42 and 43. A first piston rod 76 attached to piston 74 extends upwardly to the exterior of damper 26 where it will be connected to load 10 at point 36 (not shown in FIG. 3) through a pivot 77 similar to piston 9 of FIG. 1. A second piston rod 78 extends downwardly from piston 74 to the exterior of chamber 72 into a lower chamber 79 where it is connected to a piston 80 which divides chamber 79 into an upper chamber 81 and a lower chamber 82 to provide spring force for the spring/damper as will be explained. It will be noted that piston rod 78 provides an area on the lower surface of piston 74 which has the same area exposed to the fluid in the first and second chambers 70 and 72. This allows piston 74 to displace equal volumes (although of opposite signs) of the incompressible fluid in both chambers 70 and 72 when piston rod 76 is moved in or out of damper 26.

The lower part of housing 73 is shown connected to another pivot 77 similar to pivot 9 of FIG. 1 for connection to vehicle 12 at point 35 (not shown in FIG. 3).

Hermetic seals are shown using an upper or first bellows 83 and a lower or second bellows 84 on the ends of chambers 70 and 72 to provide motion transmitting fluid seals therefore. A conduit 85 joins the interiors of bellows 60 and 62 respectively through the interior of pistons rods 76 and 78 and is selected to be relatively non-restrictive to fluid flow. It is understood that various other sealing techniques can be used including sliding non-hermetic seals without effecting the operation of the present invention.

A source of compressible fluid 86 is shown supplying pressure to the upper and lower chambers 81 and 82 through a pair of pressure regulators 87 and a valve device 88 so that when the system is experiencing dynamic loads, as for example during launch when the pressures from the load change with various conditions, the pressures in chambers 81 and 82 can be independently controlled by the pressure regulators 87 to provide the proper stiffness for the changing conditions as will be explained in connection with FIG. 4. As will also be explained, under static conditions when the load is still as on the launch pad, the pressure regulators do not need to independently vary the pressures in chambers 81 and 82 and would only be used, if needed at all, to compensate for leakage. Accordingly, after the pressures in chambers 81 and 82 have been equalized, the pressure regulators 87 may be shut off by a manual or electric valve, not shown. Relief valve 90 is shown connected to the line from chamber 82 to the ball valve 89 so as to protect the system from over pressurization by releasing pressure when it exceeds a predetermined value. Dampers 21 and 26 will be better described in connection with FIG. 5.

The fluid conduit 42 is shown in FIG. 3 connected between the first chamber 50 of damper 21 and the second chamber 72 of damper 26. Similarly, the conduit 43 is shown connected between the second chamber 52 of damper 21 and the first chamber 70 of damper 26. With translational motion of the load 12 and the vehicle 10, both pistons 54 and 74 tend to move in the same direction while with rotational motion between the load 10 and the vehicle 12, pistons 54 and 74 tend to move in opposite directions. Accordingly, with translational motion, for example upward in FIG. 2, pistons 54 and 74 in dampers 21 and 26 would both tend to move upwardly. When piston 54 moves upwardly in FIG. 2, fluid flows out of chamber 50 through conduit 42 and into chamber 72 of damper 26 thereby assisting the upward motion of piston 74 due to the upward translational motion of the load. Similarly, fluid flows out of chamber 70 of damper 26 through conduit 43 and into chamber 52 of damper 21 thereby assisting the upward motion of piston 54. Of course, the flow of fluid between dampers 21 and 26 will be opposite to that described in the event that the load 12 moves downwardly with respect to vehicle 10. Thus the damping may be quite soft for translational motions.

The same action, above described, occurs with each of the oppositely disposed dampers in the overall system so that with translational motions of load 12 with respect to vehicle 10, the cross coupling arrangements of conduits 40–47 make the system soft or less stiff as is desired.

Figure 5:
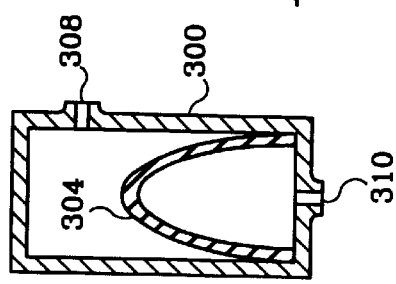

Rotational motion, on the other hand produces, for example, upward motion of piston 50 in damper 21 but downward motion of piston 74 in damper 26 in FIG. 2. With the cross coupling arrangement of conduits 42 and 43, this motion is resisted by dampers 21 and 26 since fluid tries to flow out of chambers 50 and 72 while fluid tries to flow into chambers 52 and 70 simultaneously. Of course, the flow of fluid between dampers 21 and 26 will be opposite to that described in the event that load 12 rotates to produce downward motion of piston 50 in damper 21 and upward motion of piston 74 in damper 26 of FIG. 2. Thus the damping of rotational motions is very stiff To provide for fluid expansion due to temperature variations, an additional reservoir or accumulator 91 is seen. This accumulator, in the above mentioned Osterberg and Davis et al applications, contained a piston urged downwardly by a spring. In the present invention, an alternate pneumatic type accumulator to be better described in connection with FIG. 5 is used and is seen in FIG. 3 to comprise a bladder 92 sealed to the bottom of a housing 94 and pressurized by a source of pressure 96 through a pressure regulator 98.

In the above mentioned copending Osterberg application, the accumulator was connected directly to conduits 42 and 43 by restrictive conduits. The crossectional area of restrictive conduits was made considerably less than the crossectional area of conduits 42 and 43 so as to provide more restrictive flow to the reservoir 91 than between dampers 21 and 26.

As explained in the above mentioned Davis et al application, while the accumulator operates to receive fluid due to thermal expansion, it may also receive fluid when the pressure in lines 42 and 43 increases due to rotational forces which is undesirable since it softens the stiffness of the system. While most of these forces are of a frequency much higher than that encountered by thermal expansion, so that little fluid was able to pass to the accumulator during rotational force application, some rotational forces were at a very low frequency, almost static, and in such circumstances, fluid would slowly leave the conduits 42 and 43 and enter the accumulator 91. This reduced the stiffness of the system to rotational forces and the rattle space could be violated.

The Davis et al invention solved this problem as seen in FIG. 3 by connecting, accumulator 91 through a conduit 100 to first and second one way or ball valves 104 and 106, the other side of which are connected to conduits 42 and 43 respectively. Both valves 104 and 106 are arranged so that fluid may flow only from accumulator 91 through conduit 100 and valves 104 and 106 to conduits 42 and 43 respectively. Ball valves 104 and 106 prevent fluid flow from conduits 42 and 43 to accumulator 91 and thus prevent leakage of fluid and loss of pressure when the rotational forces cause pistons 54 and 74 to move in opposite directions.

The system thus arranged can withstand most normal pressure increases due to temperature variations although extreme conditions might be harmful to the mechanical structure of the system. Also, the system can withstand most pressure increases due to rotational forces acting on pistons 54 and 74 except possibly for unusually high forces. When temperature expansion and rotational forces occur at the same time, the combination of temperature expansion and pressure due to rotational forces may exceed the desired limit for pressure. In order to avoid structural damage to the system due to extreme pressure, a pair of relief or "burp" valves 110 and 112 are shown connected between conduits 42 and 43 and accumulator 91 by a conduit 116. Burp valves 110 and 112 are set so that when a predetermined pressure is exceeded, a short duration flow release occurs. The burp valves 110 and 112 are also shown to be one-way as seen by the arrows therein so that the short duration fluid flow may only occur from conduits 42 and 43 to the accumulator 91, and not from the accumulator 91 to the conduits 42 and 43. Thus when the preset pressure is exceeded in either or both of lines 42 and 43, the burp valves will quickly release a little fluid to line 116 and accumulator 91 to quickly lower the pressure. The short period of time that burp valves 110 and 112 are open is not sufficient to significantly lower the pressure in the system and the damping due to rotational forces is not made significantly softer.

Pressure indicators 120, 122 and 124 may be attached to conduits 42, 43 and 100 so as to enable an observer to monitor the pressures therein. Also, if desired, hand operated valves (not shown) may be connected between ball valves 104 and 106 and conduits 42 and 43 respectively as well as between burp valves 110 and 112 and conduits 42 and 43 respectively so as to disable the operation of the valves if it is determined that no pressures able to produce damage to the system will be encountered.

Each of the oppositely positioned pairs of dampers in FIG. 1 is connected in the same fashion. It should also be understood that while a single accumulator 91 is shown in FIG. 2a connected to all of the conduits 40–47, a plurality of accumulators could be used each connected to different pairs of conduits. After all connections are made, the system is evacuated and is filled with the incompressible fluid.

FIG. 4 shows a spring/damper 200 for use in the present invention. In FIG. 4, a piston 202 is shown positioned in a chamber 204 of a housing member 206. Piston 202 has a leftwardly extending piston rod 212 which passes through an end member 214 of housing 206 into the interior of a first bellows 216 and is fastened to a plug member 218 in bellows 216. Plug member 218 supports an insert member 220 to which a pivot member 222 is rotatably attached for connection to the load 10. In similar fashion, piston 202 has a rightwardly extending piston rod 230 which passes through the right end of housing 206 to the interior of a second bellows 232 and is fastened to a plug member 234 in bellows 232. Plug member 234 is fastened to a piston 240 which is positioned in a chamber 242 of a housing 244. Another pivot 246 is rotatably mounted on the end of housing 244 for connection to the vehicle 12. Piston rods 212 and 230 have an interior port 250 which operates to connect the interiors of bellows 216 and 232 to allow fluid to pass therebetween.

The portion of chamber 204 to the left of piston 202 is connected by a port 260 in housing 206 to the cross conduit 42 (not shown in FIG. 4) and the portion of chamber 208 to the right of piston 202 is connected by a port 264 in housing 206 to the cross conduit 43 (not shown in FIG. 4.) The fluid in bellows 216 and 232 is provided from a source (not shown in FIG. 4) through a port 268 in end member 214.

The portion of chamber 242 to the left of piston 240 is connected to a source of pressure (not shown in FIG. 4) by a port 270 through housing 244 and the portion of chamber 242 to the right of piston 240 is connected to a source of pressure (not shown in FIG. 4) by a port 274 through housing 244.

It is seen that with pressures on both sides of piston 240, any attempted motion of piston 202 will be resisted by the pressure on one of the sides of piston 234. The stiffness of this resistance may be set by controlling the pressures through ports 270 and 274, by the area of piston 240 and by the length of the portions of chamber 244 on either side of piston 240. (For large stiffnesses, the forces due to the bellows 216 and 232 is negligible). The equation for stiffness is given by $K=1.4\ P\ (A/L)$ where K is the stiffness, P is the pressure on the resisting side of piston 240, A is the area of the piston 240 and L is the length of the chamber on the resisting side of piston 240. Note that in FIG. 4, the area on the left side of piston 240 is less than the area on the right side of piston 240 so that to have equal forces exerted in both direction, the pressure in the chamber on the left side of piston 240 must be greater than the pressure in the chamber on the right side of piston 240. In a preferred embodiment, the area on the left side of piston 240 was 46.3 square inches while the area on the right side of piston 240 was 53.3 square inches while the length of the chambers on the both sides of piston 240 was 3.6 inches. Under these conditions, when the pressure supplied by port 270 is 100 psi, the pressure supplied by port 274 was 86.9 psi in order to have equal forces on both sides of piston 240.

Under a static condition such as before launch when the load 10 is mounted on vehicle 12, the weight of load 10 applies force to the left side of piston 202 and piston 240 is forced to the right which decreases the length of the chamber on the right side of piston 242. By properly choosing the pressures on either side of piston 240, the pressures can be equalized under this initial static load situation and will thus tend to eliminate leakage across the seals at the edges of piston 240. After the pressures are equalized, the pressure regulators such as 67 and 87 of FIG. 3 may not be needed and may be shut off During a dynamic condition, such as during launch, the force on piston 202 is initially even greater to the right and then changes during flight. Under such dynamic conditions, the regulators may be turned on and the pressures on either side of piston 240 can be again adjusted to provide desired stiffness for the changing conditions.

It is seen that we have provided a system for damping the vibrations between a vehicle and a load mounted thereto so that translational vibrations are softly damped and rotational vibrations are stiffly damped and that we have done so without losing the hard damping pressure when slow rotational vibrations are encountered and still without allowing pressure to damage the system. We have furthermore provided a pneumatic spring which can easily be adjusted before, during and after launch to provide the desired stiffness without damage to the spring and which can be adjusted to accommodate various loading conditions FIG. 5 shows an accumulator which uses pneumatic forces to pressurize the system. In FIG. 5, a housing 300 contains a flexible bladder 304 sealed to the bottom interior of housing 300. A first port 308 at the upper end of housing 300 is connected to a source of pressure (not shown in FIG. 5) and a port 310 at the lower end of housing 300 communicates with the interior of the bladder 304 containing the incompressible fluid which used to pressurize the system as through line 100 of FIG. 3. As such, the desired pressure for the system is maintained by adjusting the pressure through port 308 so as to increase or decrease the pressure through port 310 as desired.

Many obvious alterations to the structures shown in connection with the preferred embodiment will occur to those having skill in the art. For example, while we have shown piston type dampers, bellows or other type dampers may also be employed and while we have shown eight dampers in a rectangular configuration, other numbers of dampers and different configurations may be employed. Also, the mounting need not necessarily be at the bottom of the load and may be placed elsewhere, for example at the center of gravity. Similarly, ball valves may be replaced by other one-way type valves and other pressure release valves may be employed. The ball valves and the pressure relief valves could also be connected between the dampers and the accumulator rather than between the conduits and the accumulator. As mentioned, it will be understood that each of the cross coupled damper pairs of FIG. 2 will operate similarly to the example shown in connection with FIG. 3 and that the accumulator 91 shown in FIG. 3 may be common to all cross coupled pairs or each pair may employ its own accumulator. Further, the accumulators may be of any sort and not necessarily of the bladder type shown in the preferred embodiment. Accordingly, we do not wish to be limited to the specific structures used to describe the preferred embodiments of the invention.

The embodiments of the invention in which an exclusive property or right is claimed are defined as follows:

1. A vibration isolation system connected between first and second devices comprising:
   first and second dampers connected between the first and second devices and cross connected by first and second conduits to provide soft damping for translational motions and hard damping for rotational motions;
   means for providing a pressurized source of fluid for the system; and,
   a pneumatic spring mounted in parallel with each damper.

2. The vibration isolation system of claim 1 wherein the pneumatic spring comprises:
   a housing having a chamber therein, the housing connected to the first device;
   a member dividing the chamber into first and second sections, the member connected to the second device; and,
   a source of pressure connected to pressurize the first and second sections.

3. The vibration isolation system of claim 2 wherein the first and second dampers comprise first and second cylinders separated by a piston to form first and second chambers in each cylinder, and the first and second conduits connect the first chamber of the first cylinder with the second chamber of the second cylinder and the second chamber of the first cylinder with the first chamber of the second cylinder so that with translational motions the pistons of the first and second cylinders move in the same direction but with rotational motion, the pistons of the first and second cylinders move in opposite directions.

4. The vibration isolation system of claim 3 wherein the member is connected to the piston to move therewith.

5. The system of claim 4 wherein the pressure in the first and second sections is controlled to vary the stiffness of the system.

6. The system of claim 5 wherein the pressures in the first and second sections are controlled independently of each other so that the pressures therein can be made equal when the piston provides a different area to the first section than it does to the second section.

7. A damping system for use in mounting a first member to a second member, comprising:
   a first fluid chamber connected to the first member;
   a second fluid chamber connected to the second member;
   first means connecting the first and second chambers so that an increase in volume of the first chamber is accompanied by a decrease in volume of the second chamber;
   a third fluid chamber connected to the first member;
   a fourth fluid chamber connected to the second member;
   second means connecting the third and fourth chambers so that an increase in volume of the third chamber is accompanied by a decrease in volume of the fourth chamber;
   a first fluid passage connecting the first and fourth chambers;
   a second fluid passage connecting the second and third chambers;
   a reservoir providing a source of pressurized fluid;
   a fifth fluid chamber;
   a sixth fluid chamber;
   third means connecting the fifth and sixth chambers so that an increase in volume of the fifth chamber is accompanied by a decrease in volume of the sixth chamber;
   a seventh fluid chamber;
   an eighth fluid chamber;
   fourth means connecting the seventh and eighth chambers so that an increase in volume of the seventh chamber is accompanied by a decrease in volume of the eighth chamber;
   connection means connecting the first and third means and connecting the second and fourth means so that they move together; and
   a source of pneumatic pressure connected to the fifth, sixth, seventh and eighth chambers to provide a spring of stiffness which can be changed by changing the pressures in the fifth, sixth, seventh and eighth chambers.

8. Apparatus according to claim 7 herein the first and second chambers are formed by a cylinder having a first movable piston therein and the third and fourth chambers are formed by a cylinder having a second movable piston therein, the fifth and sixth chambers are formed by a cylinder having a third moveable piston therein and the seventh and eighth chambers are formed by a cylinder having a fourth moveable piston therein.

9. Apparatus according to claim 8 wherein the connection means compresses a first piston rod connecting the first moveable piston with the third moveable piston and connecting the second moveable piston with the fourth moveable piston.

10. A damping arrangement for mounting a first member to a second member so that translational motion therebetween is less damped than rotational motion therebetween, comprising:

a plurality of dampers, each damper having first and second expandable fluid chambers connected so that expansion of one of the first and second chambers is normally accompanied by contraction of the other of the first and second chambers and each damper having first and second external connectors with the first external connector of each damper connected to the first member and the second external connector of each damper connected to a pneumatic spring having a housing connected to the second member;

a plurality of fluid conduits with a first one of the fluid conduits joining the first expandable chamber of a first damper with the second expandable chamber of a second damper to permit fluid flow therebetween and a second of the fluid conduits joining the first expandable chamber of the second damper to the second expandable chamber of the first damper to permit fluid flow therebetween so that with a first translational movement between the first and second members the first expandable chambers of the first and second dampers both expand while the second expandable chambers of the first and second dampers both contract but with first rotational movement between the first and second members, the first expandable chamber of the first damper and the second expandable chamber of the second damper both expand while the second expandable chamber of the first damper and the first expandable chamber of the second damper both contract; and a fluid reservoir to provide a source of pressurized fluid for the first, second, third and fourth chambers.

11. Apparatus according to claim 10 wherein the pneumatic spring comprises third and fourth expandable fluid chambers divided by a partition so that expansion of one of the third and fourth chambers is normally accompanied by contraction of the other of the third and fourth chambers; and, means connecting the partition to the second external connector of a damper.

12. Apparatus according to claim 10 wherein the fluid reservoir comprises a chamber separated into two sections by a bladder and a source of pressure connected to pressurize the first section and the second section connected to the system.

13. Apparatus according to claim 12 further including one-way flow apparatus connecting the source of pressurized fluid to the fluid dampers to permit fluid to flow between the source of pressurized fluid and the dampers and block fluid flow between the dampers and the source of pressurized fluid.

14. Apparatus according to claim 13 further including pressure relief apparatus connected to the fluid dampers to release a predetermined quantity of fluid when the pressure in the system exceed a predetermined limit.

* * * * *